US011350428B2

(12) United States Patent
Sundberg et al.

(10) Patent No.: US 11,350,428 B2
(45) Date of Patent: May 31, 2022

(54) SCHEDULING REQUEST HANDLING WITH MULTIPLE CONFIGURED TTIS

(71) Applicant: Telefonaktiebolaget LM Ericsson (publ), Stockholm (SE)

(72) Inventors: Mårten Sundberg, Årsta (SE); Gustav Almquist, Järfälla (SE); Torsten Dudda, Aachen (DE); Laetitia Falconetti, Järfälla (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 248 days.

(21) Appl. No.: 16/485,468

(22) PCT Filed: Mar. 23, 2018

(86) PCT No.: PCT/SE2018/050311
§ 371 (c)(1),
(2) Date: Aug. 13, 2019

(87) PCT Pub. No.: WO2018/174807
PCT Pub. Date: Sep. 27, 2018

(65) Prior Publication Data
US 2020/0045718 A1    Feb. 6, 2020

Related U.S. Application Data

(60) Provisional application No. 62/476,716, filed on Mar. 24, 2017.

(51) Int. Cl.
*H04W 72/12* (2009.01)
*H04L 1/08* (2006.01)

(52) U.S. Cl.
CPC ........... *H04W 72/1231* (2013.01); *H04L 1/08* (2013.01); *H04W 72/1284* (2013.01)

(58) Field of Classification Search
CPC ................... H04W 72/1231; H04W 72/1284; H04L 1/08; H04L 1/0018; H04L 1/0007
See application file for complete search history.

(56) References Cited

U.S. PATENT DOCUMENTS 8,738,983 B2   5/2014  Gerstenberger et al.
9,521,585 B2   12/2016 Yavuz et al.
(Continued)

FOREIGN PATENT DOCUMENTS

CN   101282204 A   10/2008
CN   101663852 A   3/2010
(Continued)

OTHER PUBLICATIONS

Huawei et al., "Discussion on SR for Shortened TTI", 3GPP TSG RAN WG1 Meeting #88, Athens, Greece, Feb. 13, 2017, pp. 1-4, R1-1703070, 3GPP.

*Primary Examiner* — Mounir Moutaouakil
(74) *Attorney, Agent, or Firm* — Coats & Bennett, PLLC

(57) ABSTRACT

Techniques for improved scheduling request (SR) operation using one or more short transmission time intervals (sTTIs) (908) are presented to ensure both short latency and improved wireless coverage for user equipment (UE) (102). In particular, a method (1000) performed by a UE (102) for managing SR transmissions to a network node (106) is presented. The method can include determining (1002) a value indicative of network coverage conditions, and based on the value indicative of network coverage conditions, determining (1004) a transmission duration (908) for transmitting one or more SRs (118). In addition, the example method can include transmitting (1006) the one or more SRs (118) to the network node (106) using the determined transmission duration (908). Related devices, computer programs, processor/memory combinations, and systems are likewise described.

8 Claims, 14 Drawing Sheets

(56) References Cited

U.S. PATENT DOCUMENTS

| | | | |
|---|---|---|---|
| 2014/0133447 A1* | 5/2014 | Moulsley | H04W 72/1278 |
| | | | 370/329 |
| 2016/0105905 A1* | 4/2016 | Vajapeyam | H04B 7/0626 |
| | | | 370/330 |
| 2016/0227495 A1* | 8/2016 | Lee | H04L 5/0048 |
| 2018/0092052 A1* | 3/2018 | Liu | H04W 52/343 |
| 2020/0008227 A1* | 1/2020 | Lee | H04L 1/1861 |

FOREIGN PATENT DOCUMENTS

| | | |
|---|---|---|
| CN | 101971546 A | 2/2011 |
| WO | 2016040290 A1 | 3/2016 |

\* cited by examiner

SCHEDULING REQUEST HANDLING WITH MULTIPLE CONFIGURED TTIS

CROSS-REFERENCE TO RELATED APPLICATION

The present disclosure claims priority to U.S. Provisional Patent Application No. 62/476716, filed on Mar. 24, 2017 and entitled "Scheduling Request Handling with Multiple Configured TTIs," the entirety of which is incorporated by reference.

TECHNICAL FIELD

The present disclosure relates to wireless communication, and particularly to techniques for scheduling request handling with multiple configured TTIs.

BACKGROUND

In Third Generation Partnership Project (3GPP) Long-Term Evolution (LTE) systems, data transmissions in both the downlink (i.e. from a network node or eNodeB (eNB) to a user device or user equipment (UE)) and uplink (from a user device or UE to a network node or eNB) are organized into radio frames of 10 ms, where each radio frame consists of ten equally-sized subframes of length $T_{subframe}=1$ ms, as shown in FIG. 1. LTE uses Orthogonal Frequency Division Multiple Access (OFDMA) in the downlink and Single Carrier FDMA (SC-FDMA) in the uplink. The basic LTE downlink (DL) physical resource grid can be represented as a time-frequency grid, such as the grid as illustrated in FIG. 2, where each resource element (RE) corresponds to one OFDM subcarrier during one OFDM symbol interval.

Similarly, an LTE uplink (UL) resource grid is illustrated in FIG. 3, where $N_{RB}^{UL}$ is the number of resource blocks (RBs) contained in the uplink system bandwidth, $N_{SC}^{RB}$ is the number subcarriers in each RB, typically $N_{SC}^{RB}=12$, $N_{symb}^{UL}$ is the number of SC-FDMA symbols in each slot. $N_{symb}^{UL}=7$ for normal cyclic prefix (CP) and $N_{symb}^{UL}=6$ for extended CP. A subcarrier and a SC-FDMA symbol forms an uplink RE.

In addition, downlink data transmissions from an eNB to a UE are dynamically scheduled, i.e., in each subframe the base station transmits control information about to which terminals data is transmitted and upon which resource blocks the data is transmitted, in the current downlink subframe. This control signaling is typically transmitted in the first 1, 2, 3 or 4 OFDM symbols in each subframe. A downlink system with three OFDM symbols as control is illustrated in FIG. 4. Transmissions in the uplink are—as is likewise true with respect to the downlink—dynamically scheduled through the downlink control channel. When a UE receives uplink grant in subframe n, it transmits data in the uplink at subframe n+k, where k=4 for Frequency Division Duplex (FDD) system and k varies for Time Division Duplex (TDD) systems.

In LTE, a number of physical channels are supported for data transmissions. A downlink or an uplink physical channel corresponds to a set of resource elements carrying information originating from higher layers, while a downlink or an uplink physical signal is used by the physical layer but does not carry information originating from higher layers. Example downlink physical channels and signals supported in LTE include Physical Downlink Shared Channel (PDSCH), Physical Downlink Control Channel (PDCCH), Enhanced Physical Downlink Control Channel (EPDCCH).

Reference signals can include Cell Specific Reference Signals (CRS), DeModulation Reference Signal (DMRS) for PDSCH, Channel State Information Reference Signals (CSI-RS). PDSCH is used mainly for carrying user traffic data and higher layer messages in the downlink and is transmitted in a DL subframe outside of the control region as shown in FIG. 4. Both PDCCH and EPDCCH are used to carry Downlink Control Information (DCI) such as PRB allocation, modulation level and coding scheme (MCS), precoder used at the transmitter, etc. PDCCH is transmitted in the first one to four OFDM symbols in a DL subframe, i.e. the control region, while EPDCCH is transmitted in the same region as PDSCH.

Likewise, some of the uplink physical channels and signals supported in LTE include Physical Uplink Shared Channel (PUSCH), Physical Uplink Control Channel, PUCCH, Demodulation Reference Signal (DMRS) for PUSCH, Demodulation Reference Signal (DMRS) for PUCCH. The PUSCH is used to carry uplink data or/and uplink control information from the UE to the eNodeB. The PUCCH is used to carry uplink control information from the UE to the eNodeB.

Packet data latency is one of the performance metrics that vendors, operators, and end-users (via speed test applications) regularly measures. Latency measurements are done in all phases of a radio access network system lifetime, when verifying a new software release or system component, when deploying a system and when the system is in commercial operation.

Shorter latency than previous generations of 3GPP radio access technologies (RATs) was one performance metric that guided the design of Long Term Evolution (LTE). The end-users also now recognize LTE to be a system that provides faster access to internet and lower data latencies than previous generations of RATs.

Packet data latency is important not only for the perceived responsiveness of the system; it is also a parameter that indirectly influences the throughput of the system. Hypertext Transfer Protocol/Transmission Control Protocol (HTTP/TCP) is the dominating application and transport layer protocol suite used on the internet today. The typical size of HTTP-based transactions over the internet is in the range of a few tens of kilobytes up to megabyte. In this size range, the TCP slow start period is a significant part of the total transport period of the packet stream. During TCP slow start, the performance is latency-limited. Therefore, one can quite easily establish that improved latency correspondingly improves the average throughput for these types of TCP-based data transactions. Latency reductions could positively impact radio resource efficiency and lower packet data latency could increase the number of transmissions possible within a certain delay bound. It follows that higher Block Error Rate (BLER) targets could be used for these data transmissions, thereby freeing radio resources for capacity gains on a system level.

One approach to latency reduction is the reduction of transport time of data and control signaling, by addressing the length of a transmission time interval (TTI). By reducing the length of a TTI and maintaining the bandwidth, the processing time at the transmitter and the receiver nodes is also expected to be reduced, simply because there exists less data to process within a shortened TTI. In LTE release 8, a TTI corresponds to one subframe (SF) of length 1 millisecond. One such 1 ms TTI is constructed by using 14 OFDM or SC-FDMA symbols in the case of normal cyclic prefix and 12 OFDM or SC-FDMA symbols in the case of extended cyclic prefix. In LTE release 14, a study item on latency reduction has been conducted, with the goal of specifying transmissions with shorter TTIs, such as a slot or a few symbols. An sTTI can be given any time duration, can include time-frequency resources on any number of OFDM or SC-FDMA symbols, and can start at any symbol position within the overall frame. Currently, however, the focus is to allow the STTIs to start only at certain fixed positions with durations of either 2, 3, 4, or 7 symbols. Furthermore, according to current standards formulations, the sTTI is not allowed to cross slot or subframe boundaries.

An example of this framework is shown in FIG. 5, where the duration of the uplink short TTI is 0.5 ms (i.e. seven SC-FDMA symbols for the case with normal cyclic prefix). Also, a combined length of 2 or 3 symbols are shown for the sTTI. In FIG. 5, "R" indicates the DeModulation Reference Signal (DMRS) symbols, and "D" indicate the data symbols. It should be noted that configurations other than the configuration shown in FIG. 5 are possible and that the example illustrated in FIG. 5 is simply presented to illustrate an example of the potential differences in sTTI lengths Although a shorter TTI has its merits when it comes to latency, it can also have specifically negative impact to the UL coverage—since less energy is transmitted by the UE with shorter TTI transmissions. This is particularly evident concerning the UL control channel performance, which includes performance of channels carrying Hybrid Automatic Repeat Request (HARQ) bits, channel quality information (CQI), and Scheduling Request (SR) information.

Due to the limited UL coverage when transmitting a shortened TTI, it is possible to configure a longer TTI length on the UL than in the DL to combat these problems, for example, with the standard supporting sTTI length combination in the {DL,UL} of {2,7}. As another option, the network can schedule a UE with 1 ms TTI duration dynamically on a subframe-to-subframe basis.

For the UE to indicate to the network that it has data in its UL transmission buffer and wishes a transmission of this data to be scheduled by a network node on the UL, it can indicate to the network a Scheduling Request (SR). In current systems, the SR is defined as a specific PUCCH format, PUCCH format 1, and is defined such that multiple UEs can transmit SRs simultaneously. It follows, therefore, that multiple UEs could simultaneously request to be scheduled for uplink transmission by the network, and potentially using the same resources.

The periodicity by which the SR can be sent to the network by UEs is configurable. For example, assuming that the SR is configured with a periodicity of 5 ms and the current LTE TTI of 1 ms, then a UE would only be permitted to request UL resources in every fifth transmission opportunity, leading to an implicit delay of at most 5 ms (in the worst-case timing between packet arrival at the UE buffer and the transmission of the SR). If, however, the scheduling request for sTTI is simply extended to occur more frequently than for the legacy TTI duration (i.e. 1 ms), the UE can minimize the scheduling delay. For example, if a 7-OFDM-symbol (os) sTTI is configured and UEs are permitted to transmit in each sTTI occasion, the maximum delay would be 0.5 ms (7 os). However, the coverage issue with a shorter sTTI is not solved.

This could be important since the condition of the UE might have changed since being configured with sTTI (for example the UE moving around in the cell). Having a UE repeatedly transmit an SR in an attempt to reach the network when out of coverage using the sTTI SR would not only increase interference levels in the network, but would also cause a markedly protracted scheduling delay. In addition, although a failsafe fallback whereby the sTTI is extended to the baseline TTI of 1 ms is possible, is under network control—but since the UEs, and not the network, control SRs, the same coverage adaptation is not possible in this case.

Therefore, improved sTTI implementation techniques are needed to further strengthen modern wireless communication systems—and in particular, in systems where UEs utilize STTIs during SR transmission.

SUMMARY

The present disclosure presents example techniques for SR operation using STTIs that help ensure both short latency and good communication coverage. In particular, the present disclosure describes an example method performed by a UE for managing SR transmissions to a network node. The example method can include determining a value indicative of network coverage conditions and determining a transmission duration for transmitting an SR based on the determined value. In addition, the method can include transmitting the SR to the network node using the determined transmission duration.

In a further aspect, the disclosure presents a method performed by a UE for managing SR transmissions to a network node, the method including determining a repetition factor to use for one or more transmissions of an SR. In addition, the example method can include periodically transmitting the SR to the network node using the determined repetition factor and at configured SR transmission occasions.

Furthermore, an example method performed by a network node is presented for managing scheduling requests transmitted by a user equipment. The example method can include periodically receiving an SR from the UE at certain transmission occasions defined by a shortened transmission duration. In addition, the example method can include, after each periodic SR reception, attempting to successfully decode the SR using one or more of the SR receptions until the SR is successfully decoded.

Likewise, example devices (network nodes, UEs, etc.), computer programs, processors, and memory are described.

DETAILED DESCRIPTION

The present disclosure presents various techniques for sTTI operation in wireless communication environments that mitigate the issues with existing techniques introduced above though ensuring low latency and predictable operation in varying coverage conditions.

Figure 6:
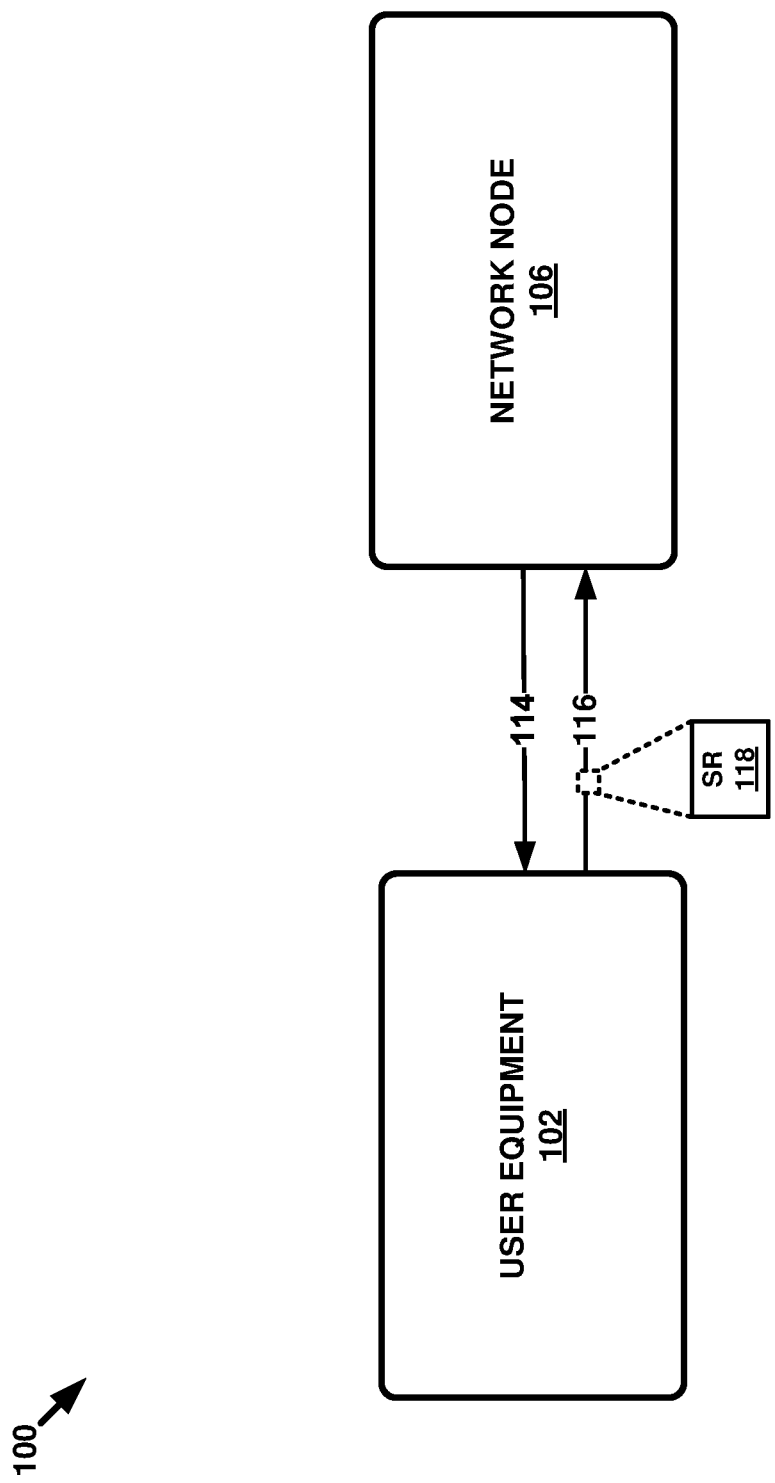
FIG. 6 illustrates a wireless communication system corresponding to example embodiments of the present disclosure.

FIG. 6 illustrates an example wireless communication system 100 that includes at least one UE 102 and at least one network node 106 that are configured to communicate over at least one DL channel 114 and at least one UL channel 116. For instance, generally, the UE 102 can transmit one or more SRs 118 over the at least one UL channel 116 and the network node 106 can provide scheduling information responsive to the one or more SRs, where the scheduling information may grant uplink time-frequency resources to the UE 102 for transmission of user data.

In an aspect of the present disclosure, the UE 102 is configured to determine which of different possible transmission durations (for example, TTIs of different durations) to utilize for SR transmission. For purposes of the present disclosure, the term TTI constitutes one form of "time duration" or "transmission duration," but is not limiting in that regard. In other words, a time duration may comprise other terms of art than a TTI, but a TTI is an example of such a transmission time duration.

In one example embodiment, the UE 102 can be configured to transmit one or more SRs using a set of transmission durations or TTIs, such as a relatively shorter TTI and a relatively longer TTI (e.g. 2 os sTTI and 1 ms TTI in LTE, not limiting). In such an example, the shorter TTI can be considered to be operable with a higher frequency (and corresponding lower delay), while the longer TTI may operate more robustly than the shorter TTI in more challenging coverage conditions. Accordingly, in some examples, UE 102 can be configured to detect varying coverage conditions, and based on the detected coverage conditions, can select appropriate SR resources corresponding to a shorter TTI or a longer TTI of possible TTIs for SR transmission. In an aspect, the UE 102 can be configured to select a particular transmission duration of different transmission durations with which the UE 102 is configured (e.g., the shorter TTI or the longer TTI) based on rules sets presented in a technical standard, such as a wireless communication specification published by a standards body (e.g., 3GPP).

Figure 7:
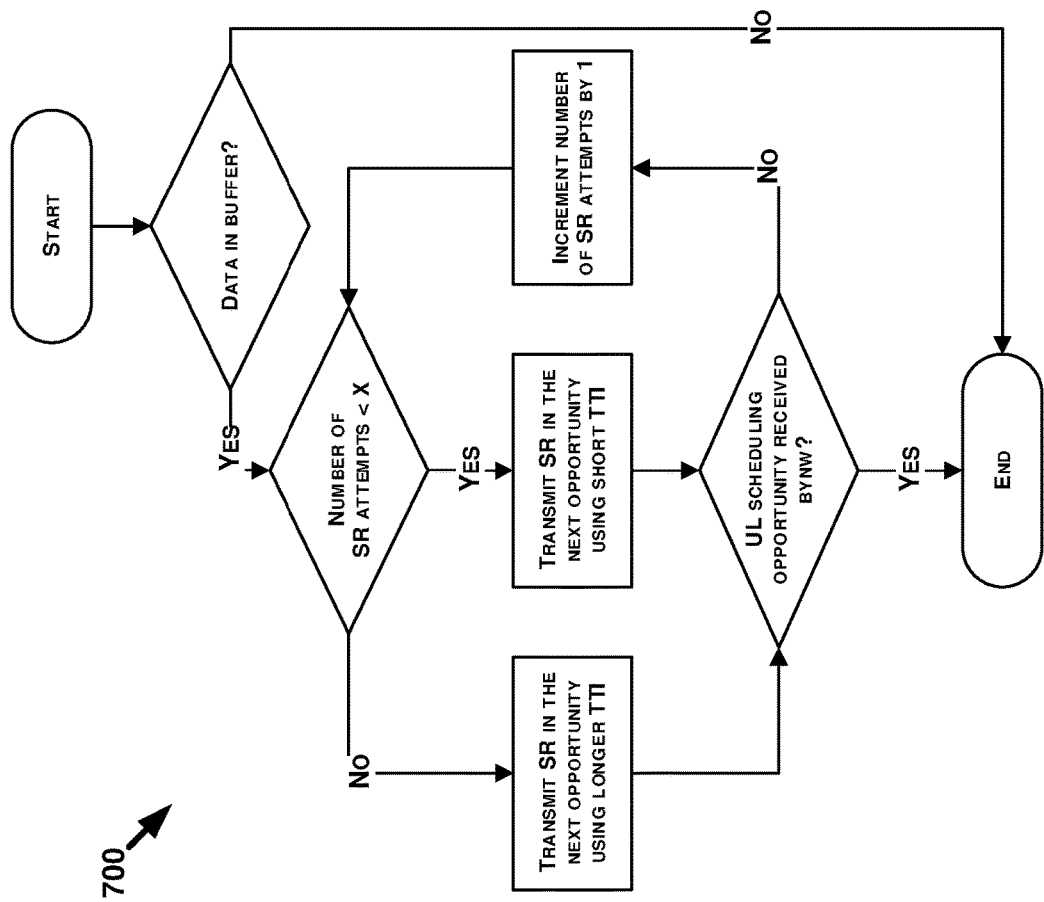
FIG. 7 illustrates an example method performed by a UE according to one or more embodiments.

One such set of rules could mandate that the shorter TTI is used in an initial particular number X SR transmission attempts, and if no response to the transmission attempts is received from the network node 106, the UE 102 can be configured to adapt to the longer TTI or some other transmission duration from those with which the UE 102 is configured. FIG. 7 illustrates such an example in flowchart 700. As shown, where the UE 102 determines that it has uplink data to transmit it its buffer, it can first utilize a first transmission duration that is relatively short in duration (e.g. sTTI) in the next SR transmission opportunity. If no response is received from the network node 106 indicating that the UE 102 has been granted uplink resources to transmit the buffered data, the UE 102 increments the number of SR attempts, ensures that the number is less than (or equal to X) and can repeat SR transmissions using the first transmission duration until X is reached (assuming no UL grant). Then, when X SR attempts have been transmitted, the UE 102 can select a second transmission duration that can be relatively longer (long TTI) than the first transmission duration, for instance, until a grant is received, a threshold number of SR attempts is reached, an SR attempt duration threshold time is reached, or a particular time (such as a subframe or frame boundary) is reached.

In examples following the aspects of flowchart 700, X can take any integer value, starting from 1, and can either be predefined in standards specification text or signaled by the network node 106 to the UE 102. In another example aspect, the transmission power utilized by the UE 102 for transmission of SRs is increased for each SR transmission attempt (e.g., when no response to the SR transmissions is received yet from the network) before switching to the different transmission duration, such as the longer TTI.

Figure 8:
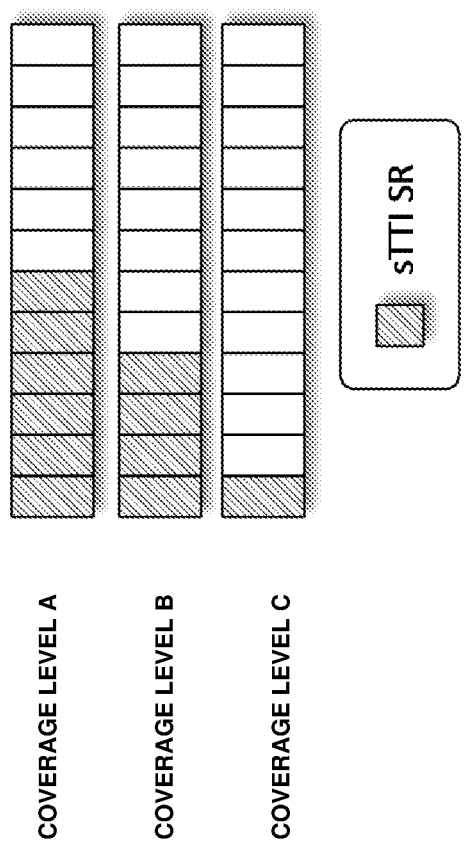
FIG. 8 illustrates an example aspect of a method performed by a UE according to one or more embodiments.

FIG. 8 illustrates another example embodiment whereby the UE 102 is configured with only a particular transmission duration for SR transmission, such as a shorter TTI (sTTI), which can be a transmission duration configured by the network node 106 for data transmission. To maintain low latency, the SR is sent by the UE 102 according to a configured periodicity, but the UE 102 can, based on its estimation of the coverage situation (e.g., measured channel conditions, throughput, signal-to-noise ratio, etc.) transmit an SR in each transmission opportunity (i.e. performing repetitions in time) without waiting for a response from the network node 106. For instance, in FIG. 8, this is illustrated by showing multiple coverage levels A, B, and C, which may be selected by a UE 102 depending on the determined values of one or more indicators of network coverage, channel conditions, etc. For instance, the UE 102 may first select coverage level A in relatively good network conditions, as it includes a single short TTI SR transmission. However, as determined coverage conditions deteriorate, the UE 102 can choose coverage level B or C, which include additional consecutive sTTI SR transmissions. These additional transmissions can increase the chances of the SR being successfully received by the network node 106, assuming the SR is not successfully received with the first SR transmission instance.

Figure 9:
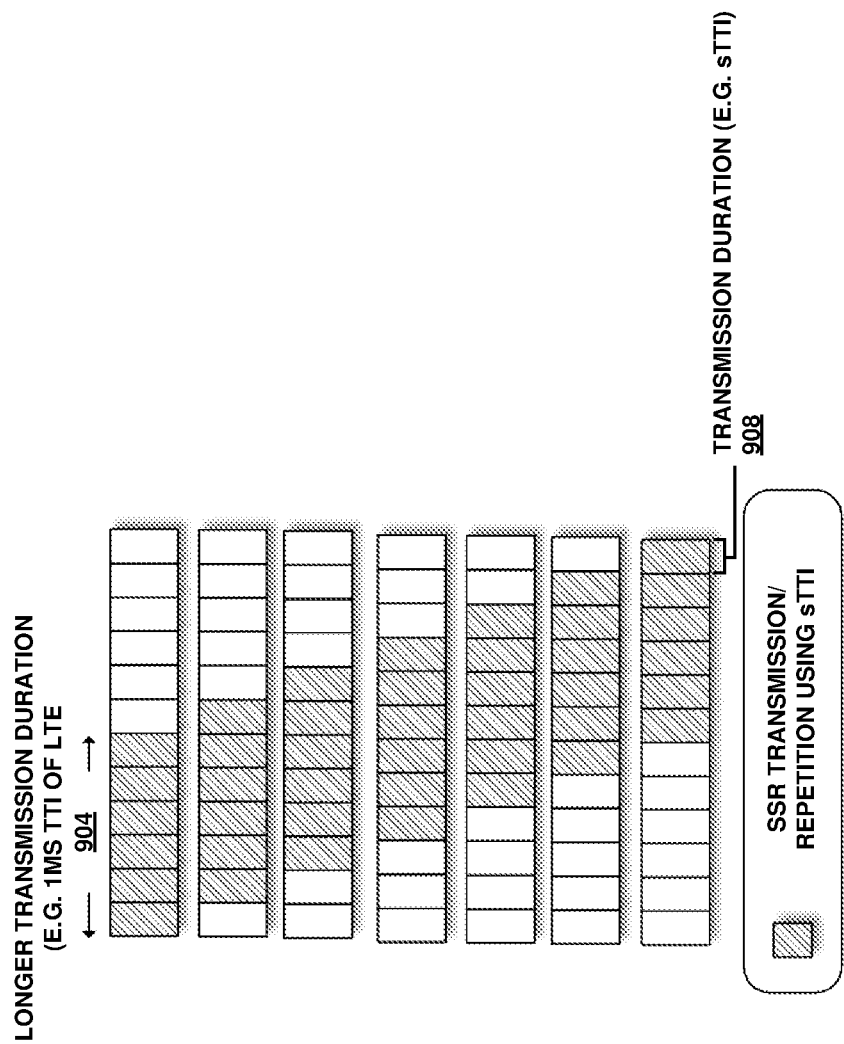
FIG. 9 illustrates an example aspect of a method performed by a UE according to one or more embodiments.

FIG. 9 illustrates an additional example embodiment that can be utilized according to the present disclosure. In this example, the UE 102 is again configured with an SR 118 using the same shorter transmission duration (or sTTI) 908 as configured by the network for data transmission, versus the relatively longer transmission duration 904 (long TTI), such as the 1 ms TTI of LTE shown for illustration purposes in FIG. 9. To ensure proper coverage of the SR, the UE 102 transmits a predefined number N of transmissions (shaded STTIs in FIG. 9). As shown in the figure, these transmissions can be consecutive in time. In a further embodiment, the number N of transmissions to be used, and the mapping of the transmissions onto physical time-frequency resources is defined by a standard specification. Alternatively or additionally, the mapping can be governed according to information signaled to the UE 102 by radio resource control (RRC) signaling or with more dynamic signaling (e.g. DCI).

Furthermore, in an embodiment concerning the network node, the network node 106 may attempt to detect a SR based on a one or more SR transmissions, where, for example, this number is smaller than a predefined number of SR transmissions that the UE 102 is to utilize to determine the number of SR transmission repetitions. In such examples, if the SR could not be detected by the network node 106, the network node 106 can be configured to detect (e.g., successfully receive and decode) a SR based on a higher number of SR transmissions from the UE 102, up to the configured number of SR transmissions.

In such examples at the network node 106 where more than one SR transmission/repetition is successfully received, the transmissions can be combined to provide processing gain. This aggregation of received SR transmission repetitions can allow the UE 102 to operate in more challenging coverage conditions than it otherwise could have without such repetitions being utilized for SR transmission. Furthermore, in another aspect, the power of the N number of SR transmissions is increased for each SR attempt that is transmitted without the UE 102 receiving a response from the network node 106, for instance, until a maximum configured output power level is reached (if not already reached in the first transmission).

Furthermore, the present disclosure contemplates an example embodiment whereby a UE 102 configured with a scheduling request using a transmission duration of a relatively shorter duration (i.e. shorter TTI, such as that configured by the network for data transmission) repeats the SR transmissions consecutively (e.g. periodically or at defined UL transmission instances) or continuously (e.g. always transmitting the SR where it is possible) until reaching a specific point in time, such as, but not limited to the LTE subframe boundary. In an aspect, this continuous transmission of the SR can be utilized by the UE 102 where the SR must be transmitted with particularly high reliability and with particularly low latency (in other words, where the radio resource usage is not of a concern). In some implementations of this example embodiment, the UE 102 continuously transmits the SR until it receives a response from the network node 106. However, in some instances, an upper limit can be defined on the number of permitted SR transmission repetitions/attempts to avoid continuous UE 102 transmission where the UE 102 is decidedly out of coverage range and/or where the network is overloaded.

Moreover, in some examples, the network node 106 can, in all cases involving repetitions of the SR in the uplink, attempt to decode and respond to the received SR after each repetition, leveraging a currently received SR and any previously received SRs to increase the probability of successfully decoding the SR. By utilizing this technique, the system can minimize latency given the current coverage conditions at any point in time.

Furthermore, in a further feature of the presently disclosed techniques, any of the example embodiments discussed above can be configured depending on the logical channel over which communication is taking place. For example, the number of repetitions of the SR transmission N (also referred to herein as an example of a repetition factor for one or more SR transmissions) or the number of SR transmission attempts X can be determined or configured based on the logical channel and corresponding parameters associated with the SR transmission. For instance, if the logical channel is of high priority, X can be set to a large value.

Figure 10:
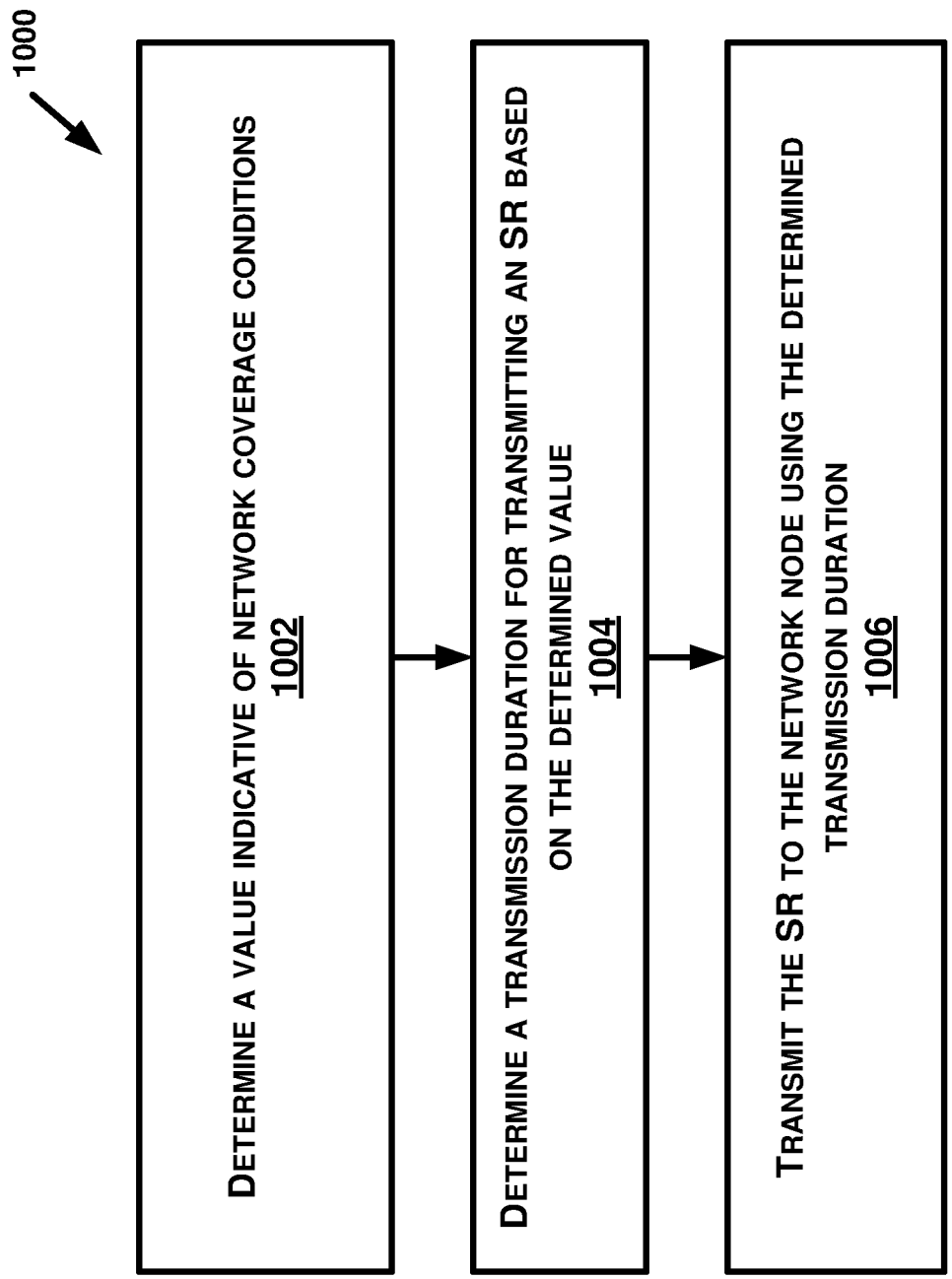
FIG. 10 illustrates a method performed by a UE according to one or more embodiments.

Further aspects of the techniques presented above are explained in reference to FIGS. 10-13, which present example methods performed by UE 102 or network node 106 according to certain embodiments. For instance, FIG. 10 presents an example method 1000 performed by UE 102 for managing SR transmissions to a network node 106. At block 1002, the method can include the UE 102 determining a value indicative of network coverage conditions, such as a signal-to-noise ratio, received signal power, or other metric known in the art. Furthermore, at block 1004, the method 1000 can include determining a transmission duration (e.g. TTI such as an sTTI) for transmitting an SR based on the determined value. In addition, at block 1006, the method 1000 can include transmitting the SR to the network node using the determined transmission duration.

In addition to the aspects of method 1000 explicitly provided in FIG. 10, method 1000 may include one or more additional aspects that constitute a non-exclusive set of optional features that can be performed by UE 102 in addition to those described above. For instance, in some examples, the determined transmission duration can include one of multiple different transmission durations with which the UE is configured, such as a short TTI or a longer TTI in some instances. In addition, in some examples, transmitting the SR to the network node at block 1006 can include transmitting the SR to the network node a particular number of times.

In addition, method 1000 can include determining that no response has been received from the network node 106 in response to any of the particular number of times the SR was transmitted and determining a longer transmission duration for transmitting an SR based on determining that no response has been received. Once the transmission duration has been altered (e.g. from a sTTI to a longer TTI) the method can include transmitting the SR to the network node using the longer transmission duration. In an additional aspect, the method 1000 can include transmitting each SR with a same transmission power or a greater transmission power than that of its preceding SR transmission, for instance, up to a maximum allowed power, to increase the probability that the SR will be successfully received.

Figure 11:
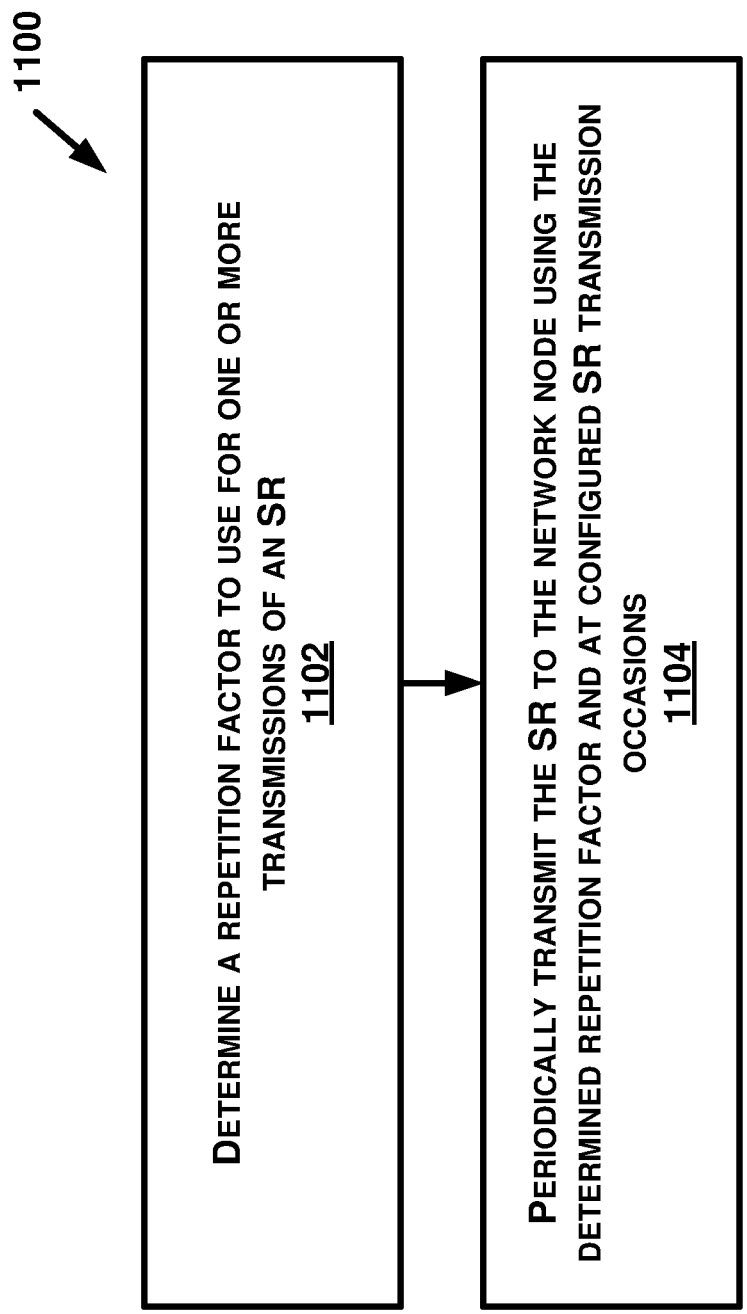
FIG. 11 illustrates a method performed by a UE according to one or more embodiments.

FIG. 11 presents an example method 1100 for managing scheduling request transmissions to a network node 106. In an aspect, method 1100 can include, at block 1102, determining a repetition factor to use for one or more transmissions of an SR. In addition, at block 1104, method 1100 can include the UE 102 periodically transmitting the SR to the network node 106 using the determined repetition factor and at configured SR transmission occasions.

In addition to the aspects of method 1100 explicitly provided in FIG. 11, method 1100 may include one or more additional aspects that constitute a non-exclusive set of optional features that can be performed by UE 102 in addition to those described above. For instance, in method 110, the repetition factor can define a number of times that an SR is to be transmitted, a periodicity of the transmissions, certain SR transmission opportunities that are to be utilized for SR transmission, and the like. In addition, this repetition factor can be determined based on radio resource control (RRC) signaling, downlink control information (DCI) signaling, rules mandated by a wireless standard, and/or a value indicative of network conditions. In addition, in some examples of method 1100, periodically transmitting the SR to the network node can include transmitting the SR consecutively at every transmission occasion defined by a shortened transmission duration. Furthermore, method 1100 can further include halting transmission of the SR(s) after having periodically transmitted the SR at consecutive transmission occasions for a defined time duration or until a defined point in time, such as a subframe boundary, frame boundary, or any other defined boundary in the transmission scheduling framework of the utilized wireless standard or RAT. In a further aspect of either method 1000 or 1100, the transmission of one or more SRs may depend on a logical channel over which the one or more SRs are transmitted or received, as explained above.

Figure 12:
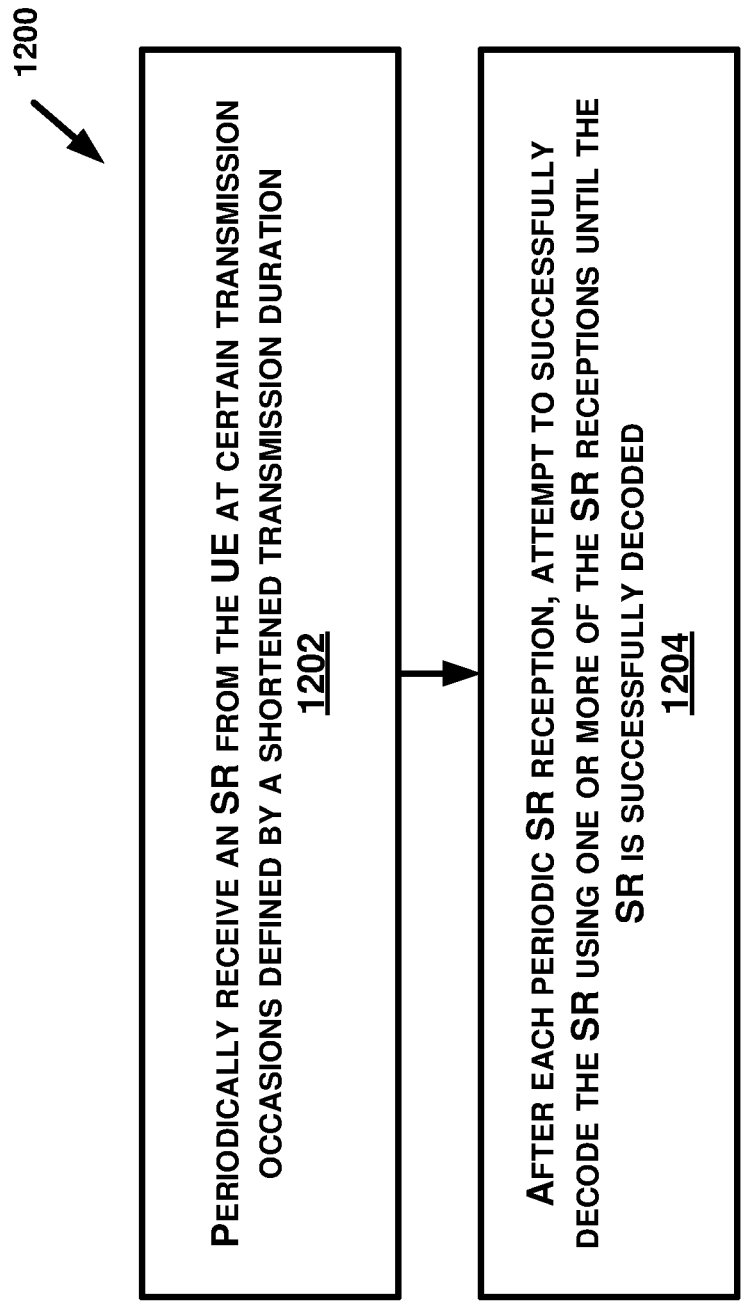
FIG. 12 illustrates a method performed by a network node according to one or more embodiments.

FIG. 12 presents an example method 1200 performed by a network node 106 for managing SRs transmitted by a UE 102. As shown in block 1202, the method 1200 can include periodically receiving an SR from the UE 102 at certain transmission occasions defined by a shortened transmission duration. In addition, at block 1204, the method 1200 can include, after each periodic SR reception, attempting to successfully decode the SR using one or more of the SR receptions until the SR is successfully decoded.

Figure 13B:
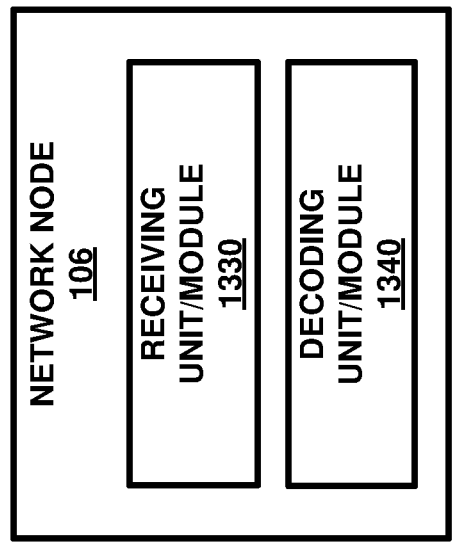
FIGS. 13A and 13B illustrate aspects of an example network node in example embodiments of the present invention.
Figure 13A:
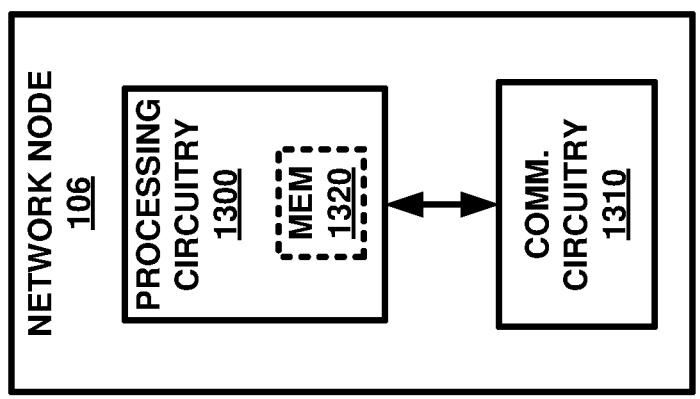

FIG. 13A illustrates additional details of an example network node 106 of a wireless communication system 100 according to one or more embodiments. The network node 106 is configured, e.g., via functional means or units (also may be referred to as modules or components herein), to implement processing to perform certain aspects described above in reference to at least the aspects of FIG. 12. As shown in FIG. 13B, the network node 106 in some embodiments for example includes means, modules, components, or units 1330 and 1340 (among other possible means, modules, components, or units not shown explicitly in FIG. 13B) for performing aspects of these techniques. In some examples, these means, modules, components, or units can be realized in processing circuitry 1300. Specifically, the functional means or units of the network node 106 may include a receiving unit/module 1330 configured to receive one or more SRs from a UE 102, such as in block 1202 of FIG. 12. In addition, the network node 106 can include a decoding unit/module 1340 configured to decode the one or more SRs received by the network node 106, such as in block 1206 of FIG. 12, above.

In at least some embodiments, the network node 106 comprises processing circuits 1300, which may include one or more processing circuits, configured to implement techniques described in reference to method 1200 presented in FIG. 12 and certain associated processing of the features described in relation to FIG. 12 and/or other figures, such as by implementing functional means or units above (or those not explicitly shown). In one embodiment, for example, the processing circuit(s) 1300 implements functional means or units as respective circuits. The circuits in this regard may comprise circuits dedicated to performing certain functional processing and/or one or more microprocessors in conjunction with memory 1320. In embodiments that employ memory 1320, which may comprise one or several types of memory such as read-only memory (ROM), random-access memory, cache memory, flash memory devices, optical storage devices, etc., the memory 1320 stores program code that, when executed by the one or more for carrying out one or more microprocessors, carries out the techniques described herein.

In one or more embodiments, the network node 106 also comprises communication circuitry 1310. The communication circuitry 1310 includes various components (e.g., antennas) for sending and receiving data and control signals. More particularly, the circuitry 1310 includes a transmitter that is configured to use known signal processing techniques, typically according to one or more standards, and is configured to condition a signal for transmission (e.g., over the air via one or more antennas). Similarly, the communication circuitry 1310 includes a receiver that is configured to convert signals received (e.g., via the antenna(s)) into digital samples for processing by the one or more processing circuits. In some examples, this communication circuitry 1310 may include receiving unit/module 1330.

Figure 1:
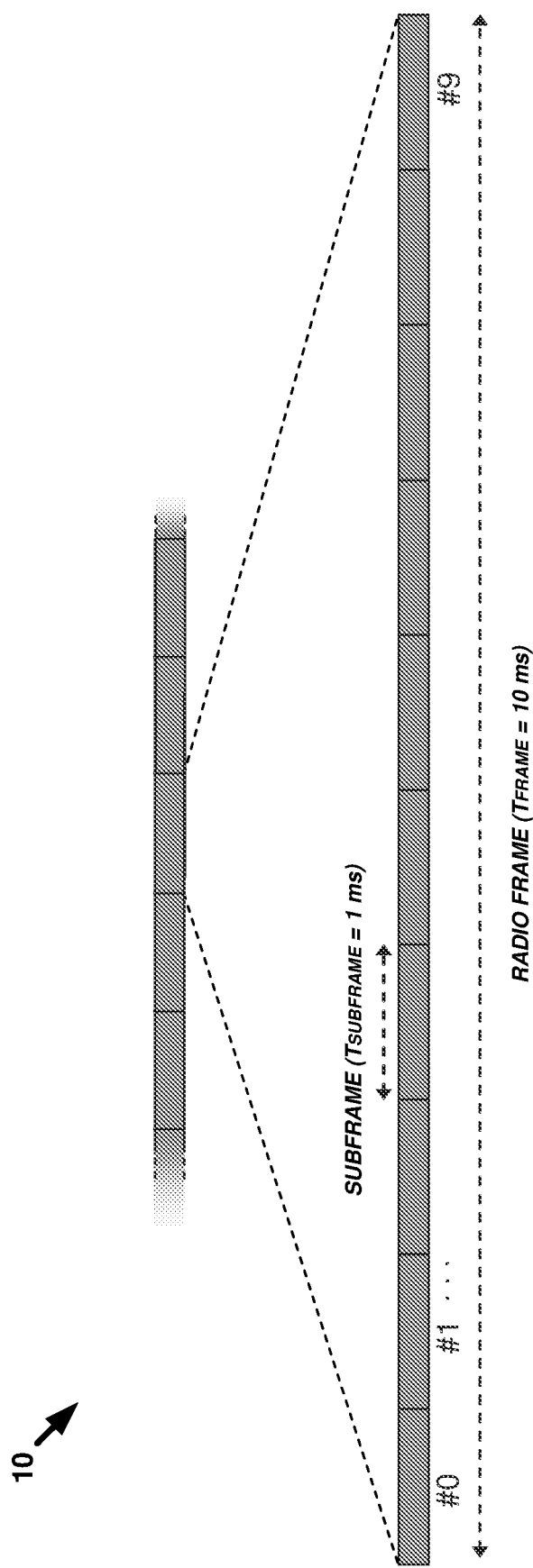
FIG. 1 presents an LTE time-domain structure.
Figure 2:
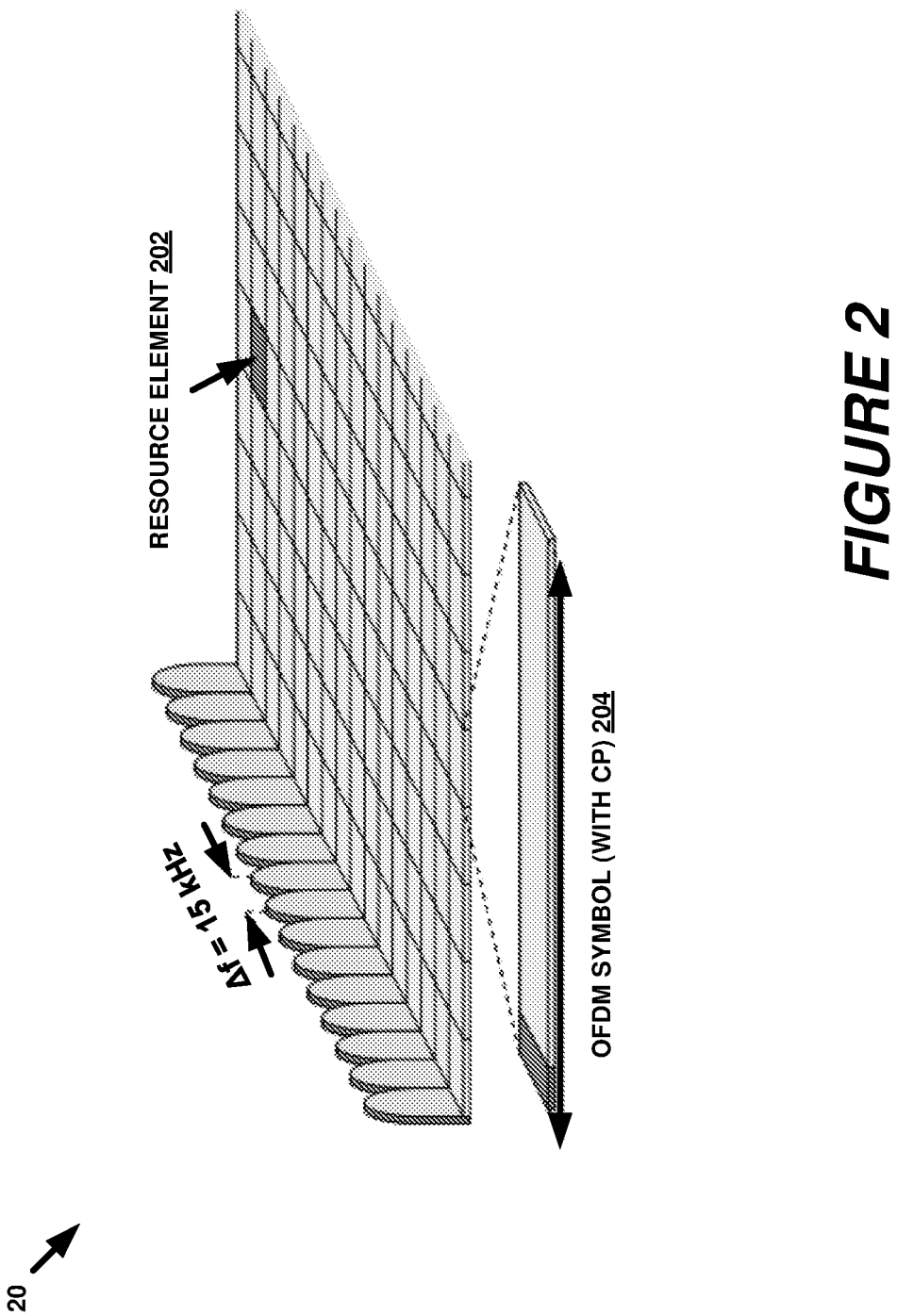
FIG. 2 presents an LTE DL physical resource grid.
Figure 3:
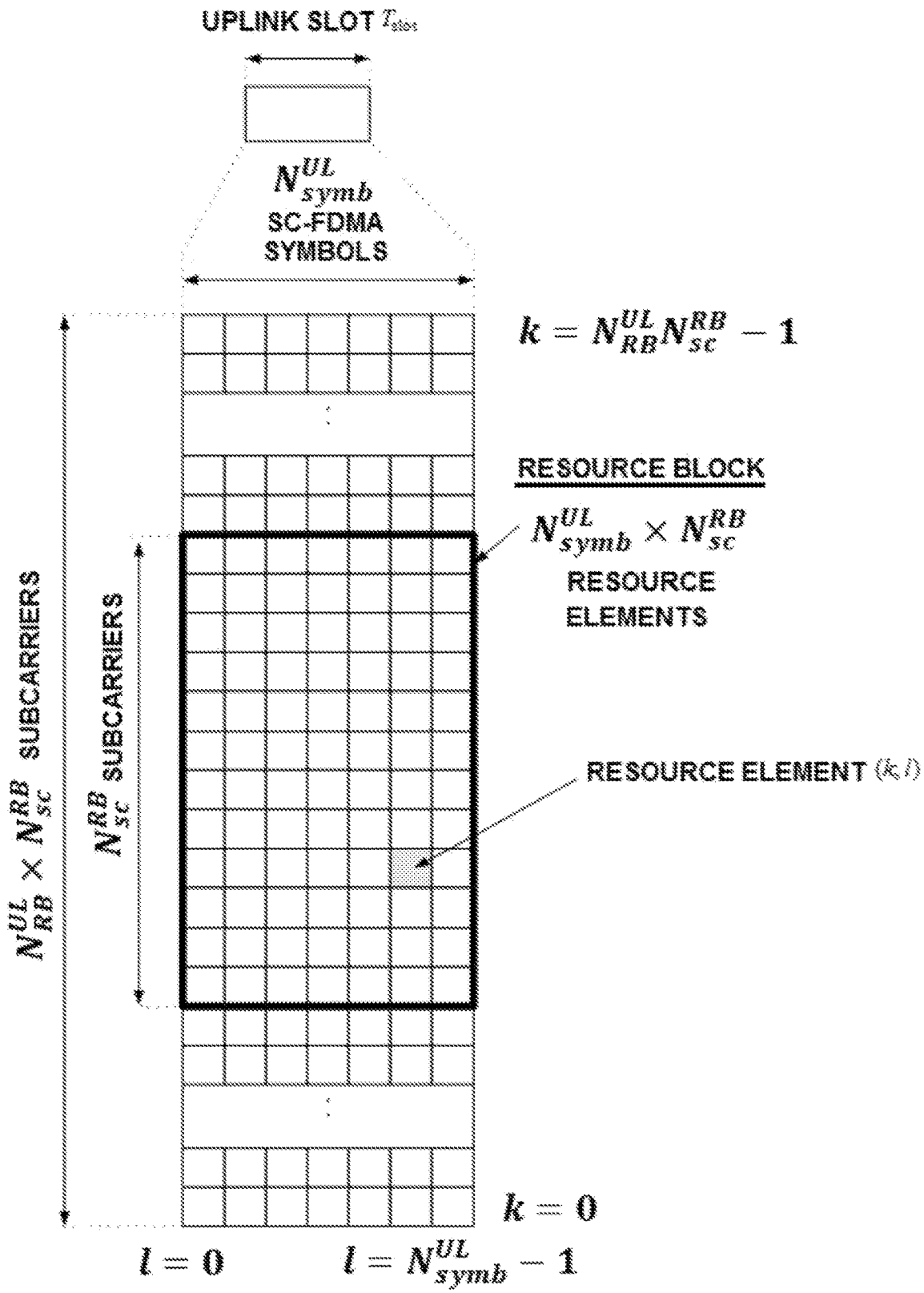
FIG. 3 presents an LTE UL physical resource grid.
Figure 4:
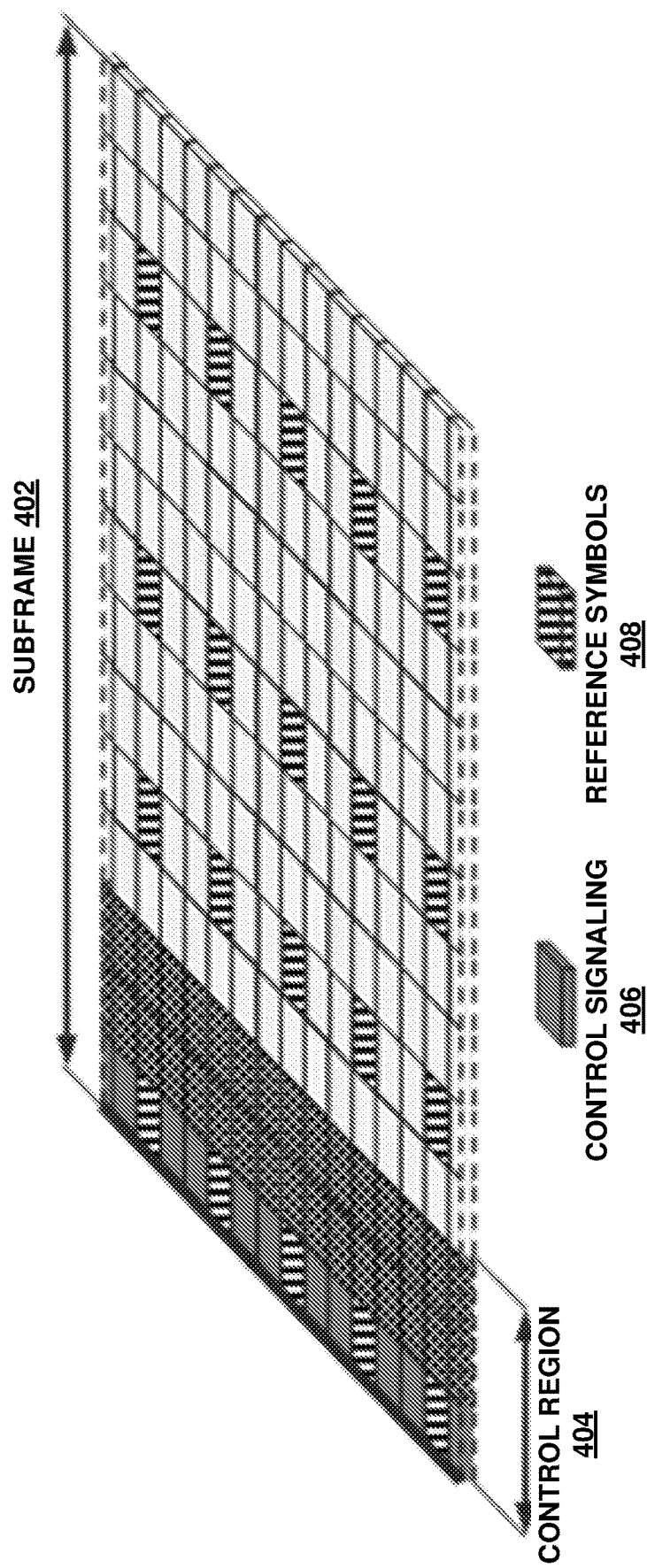
FIG. 4 presents an example downlink resource grid for a subframe.
Figure 5:
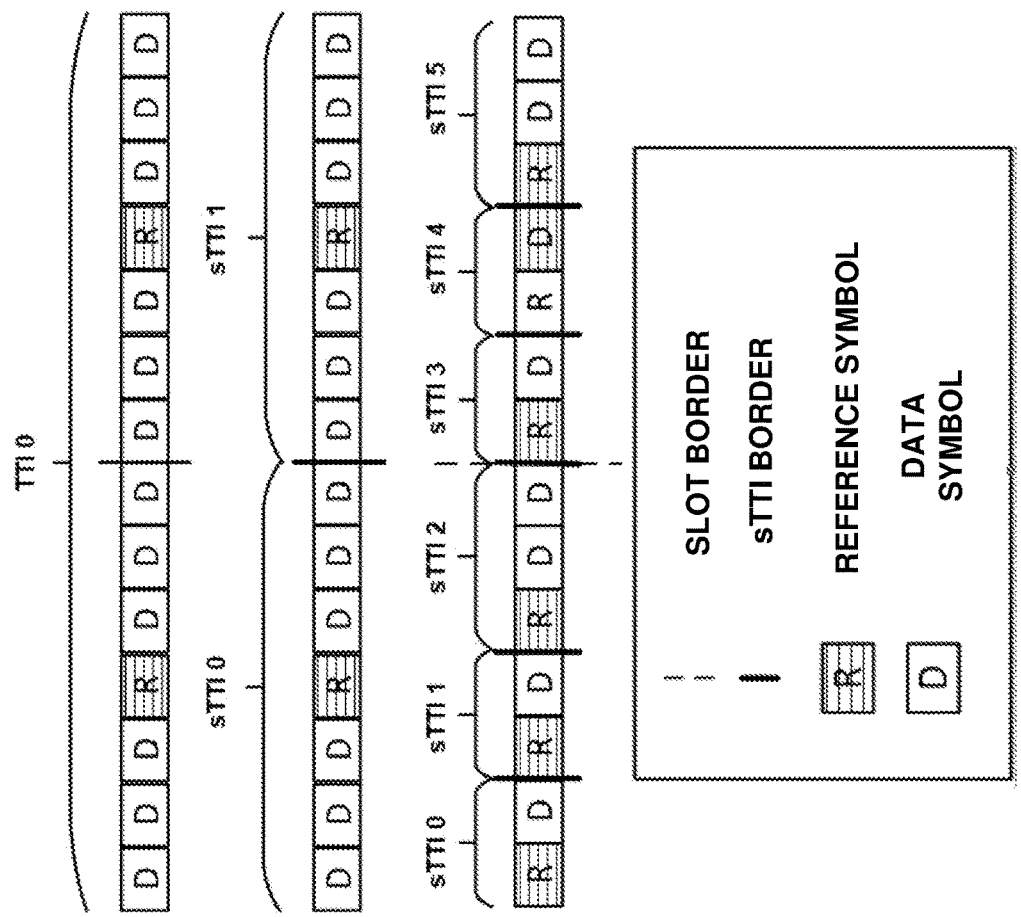
FIG. 5 presents an example of a ⅔ symbol sTTI configuration within an uplink subframe.
Figure 14B:
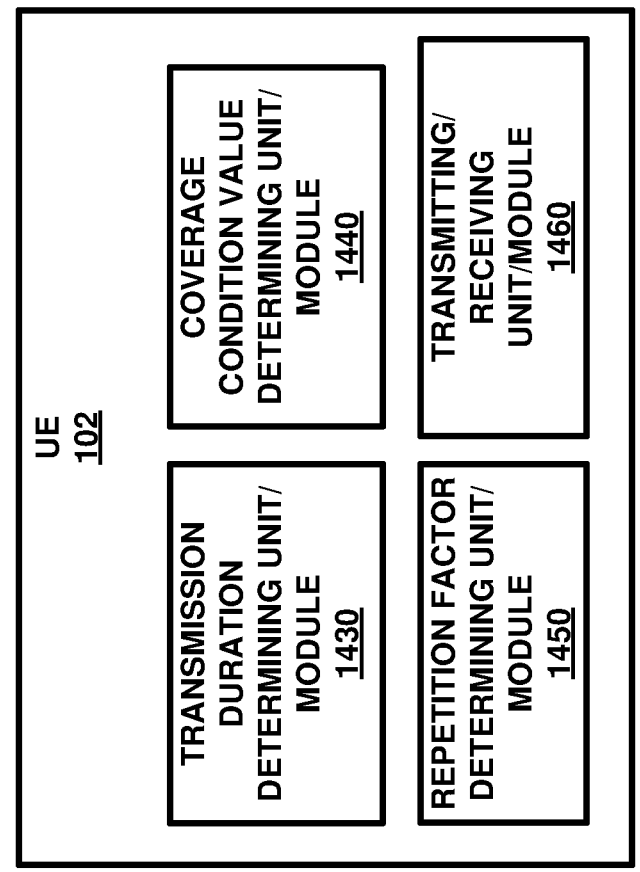
FIGS. 14A and 14B illustrate aspects of an example UE in example embodiments of the present invention.
Figure 14A:
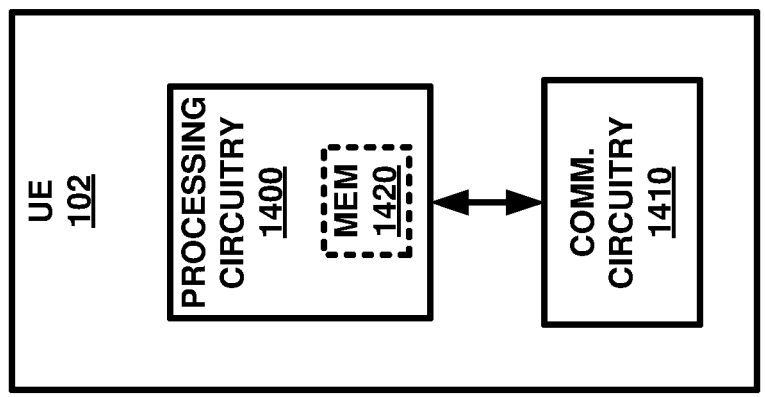

FIG. 14A illustrates additional details of an example UE 102 of a wireless communication system 100 according to one or more embodiments. The UE 102 is configured, e.g., via functional means or units (also may be referred to as modules or components herein), to implement processing to perform certain aspects described above in reference to at least the aspects of FIGS. 1 and 3. As shown in FIG. 14B, the UE 102 in some embodiments for example includes means, modules, components, or units 1430, 1440, 1450, and/or 1460 (among other possible means, modules, components, or units not shown explicitly in FIG. 14B) for performing aspects of the techniques described above. In some examples, these means, modules, components, or units can be realized in processing circuitry 1400. Specifically, the functional means or units of the UE 102 may include a transmission duration determining unit/module 1430 configured to determine a transmission duration (e.g. TTI) based on a coverage condition or value indicative thereof, such as in block 1104 of method 1100 outlined in reference to FIG. 11. In addition, the UE 102 can include a coverage condition value determining unit/module 1440 configured to determine a value indicative of a coverage condition experienced by the UE 102, as performed in block 1102 of FIG. 11, as described above. The functional means or units of the UE 102 may include a repetition factor determining unit/module 1450 configured to determine a repetition factor for SR transmission. In addition, the UE 102 can include a transmitting/receiving unit/module 1440 configured to transmit and receive wireless communications such as transmitting SRs and receiving scheduling messages and other control signals from the network node 106, as described above.

In at least some embodiments, the UE 102 comprises one or more processing circuitry/circuits 1400 configured to implement processing of the method 1100 presented in FIG. 11 and certain associated processing of the features described in relation to FIG. 11 and other figures, such as by implementing functional means or units above. In one embodiment, for example, the processing circuit(s) 1400 implements functional means or units as respective circuits. The circuits in this regard may comprise circuits dedicated to performing certain functional processing and/or one or more microprocessors in conjunction with memory 1420. In embodiments that employ memory 1420, which may comprise one or several types of memory such as read-only memory (ROM), random-access memory, cache memory, flash memory devices, optical storage devices, etc., the memory 1420 stores program code that, when executed by the one or more for carrying out one or more microprocessors, carries out the techniques described herein.

In one or more embodiments, the UE 102 also comprises communication circuitry 1410. The communication circuitry 1410 includes various components (e.g., antennas) for sending and receiving data and control signals. More particularly, the circuitry 1410 includes a transmitter that is configured to use known signal processing techniques, typically according to one or more standards, and is configured to condition a signal for transmission (e.g., over the air via one or more antennas). Similarly, the communication circuitry includes a receiver that is configured to convert signals received (e.g., via the antenna(s)) into digital samples for processing by the one or more processing circuits. In some embodiments, communication circuitry 1410 includes transmitting/receiving unit/module 1460.

In an aspect, the UE 102 may correspond to any mobile (or even stationary) device that is configured to receive/consume user data from a network-side infrastructure, including laptops, phones, tablets, IoT devices, etc. Thus, UE 102 is any type device capable of communicating with a network node 106 over radio signals, such as, but not limited to, a device capable of performing autonomous wireless communication with one or more other devices, including a machine-to-machine (M2M) device, a machine-type communications (MTC) device, a user equipment (UE) (however it should be noted that the UE does not necessarily have a "user" in the sense of an individual person owning and/or operating the device). An UE may also be referred to as a radio device, a radio communication device, a wireless terminal, or simply a terminal—unless the context indicates otherwise, the use of any of these terms is intended to include device-to-device UEs or devices, machine-type devices or devices capable of machine-to-machine communication, sensors equipped with a wireless device, wireless-enabled table computers, mobile terminals, smart phones, laptop-embedded equipped (LEE), laptop-mounted equipment (LME), USB dongles, wireless customer-premises equipment (CPE), etc. In the discussion herein, the terms machine-to-machine (M2M) device, machine-type communication (MTC) device, wireless sensor, and sensor may also be used. It should be understood that these devices may be UEs, but are generally configured to transmit and/or receive data without direct human interaction. Additional examples of UEs are target device, PDA, iPad, Tablet, mobile terminals, smart phone, laptop embedded equipped (LEE), laptop mounted equipment (LME), USB dongles etc.

In some embodiments generic terminology, "radio network node" or simply "network node (NW node)", is used. It can be any kind of network node which may comprise of base station, radio base station, base transceiver station, base station controller, network controller, evolved Node B (eNB), Node B, relay node, access point, radio access point, Remote Radio Unit (RRU) Remote Radio Head (RRH) etc.

In the present disclosure, a network node 106 is a general term and can correspond to any type of radio network node or any network node, which communicates with a UE and/or with another network node. Examples of network nodes are NodeB, base station (BS), multi-standard radio (MSR) radio node such as MSR base station, eNodeB, gNodeB. MeNB, SeNB, network controller, radio network controller (RNC), base station controller (BSC), relay, donor node controlling relay, base transceiver station (BTS), access point (AP), transmission points, transmission nodes, RRU, RRH, nodes in distributed antenna system (DAS), core network node (e.g. MSC, MME etc), O&M, OSS, SON, positioning node (e.g. E-SMLC), MDT etc. The term radio access technology, or RAT, may refer to any RAT e.g. UTRA, E-UTRA, narrow band internet of things (NB-IoT), WFi, Bluetooth, next generation RAT (NR), 4G, 5G, etc. Any of the first and the second nodes may be capable of supporting a single or multiple RATs. The term signal used herein can be any physical signal or physical channel. Examples of physical signals are reference signal such as PSS, SSS, CRS, PRS etc. The term physical channel (e.g., in the context of channel reception) used herein is also called as 'channel. Examples of physical channels are MIB, PBCH, NPBCH, PDCCH, PDSCH, sPUCCH, sPDSCH. sPUCCH. sPUSCH, MPDCCH, NPDCCH, NPDSCH, E-PDCCH, PUSCH, PUCCH, NPUSCH etc.

The term time resource used herein may correspond to any type of physical resource or radio resource expressed in terms of length of time. Examples of time resources are: symbol, time slot, subframe, radio frame, TTI, interleaving time, etc. The term TTI used herein may correspond to any time period over which a physical channel can be encoded and interleaved for transmission. The physical channel is decoded by the receiver over the same time period (T0) over which it was encoded. The TTI may also interchangeably called a transmission duration, short TTI (sTTI), transmission time, slot, sub-slot, mini-slot, short subframe (SSF), mini-subframe etc. The term requirements used herein may comprise any type of UE requirements related to UE measurements aka radio requirements, measurement requirements, RRM requirements, mobility requirements, positioning measurement requirements etc. Examples of UE requirements related to UE measurements are measurement time, measurement reporting time or delay, measurement accuracy (e.g. RSRP/RSRQ accuracy), number of cells to be measured over the measurement time etc. Examples of measurement time are L1 measurement period, cell identification time or cell search delay, CGI acquisition delay etc.

Those skilled in the art will also appreciate that embodiments herein further include corresponding computer programs. A computer program comprises instructions which, when executed on at least one processor of the network node 106 or UE 102, cause these devices to carry out any of the respective processing described above. Furthermore, the processing or functionality of network node 106 or UE 102 may be considered as being performed by a single instance or device or may be divided across a plurality of instances of network node 106 or UE 102 that may be present in a given system such that together the device instances perform all disclosed functionality. Embodiments further include a carrier containing such a computer program. This carrier may comprise one of an electronic signal, optical signal, radio signal, or computer readable storage medium. A computer program in this regard may comprise one or more code modules corresponding to the means or units described above.

The present embodiments may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method, performed by a user equipment (UE), for managing scheduling request (SR) transmissions to a network node, the method comprising:
   determining a value indicative of network coverage conditions;
   determining a transmission duration for transmitting an SR based on the determined value; and
   transmitting the SR to the network node using the determined transmission duration, a particular number of times;
   determining that no response has been received from the network node in response to any of the particular number of times the SR was transmitted;
   determining a longer transmission duration for transmitting an SR based on determining that no response has been received; and
   transmitting the SR to the network node using the longer transmission duration.

2. The method of claim 1, wherein the determined transmission duration comprises one of multiple different transmission durations with which the UE is configured.

3. The method of claim 1, wherein the transmitting the SR to the network node a particular number of times comprises transmitting each SR with a same transmission power or a greater transmission power than that of its preceding SR transmission.

4. The method of claim 1, wherein transmission of one or more SRs depends on a logical channel over which the one or more SRs are transmitted.

5. A user equipment (UE) configured to perform scheduling request (SR) transmissions to a network node, the UE comprising:
   processing circuitry;
   memory containing instructions executable by the processing circuitry whereby the UE is operative to:
      determine a value indicative of network coverage conditions;
      determine a transmission duration for transmitting an SR based on the determined value; and
      transmit the SR to the network node using the determined transmission duration a particular number of times;
   determine that no response has been received from the network node in response to any of the particular number of times the SR was transmitted;
   determine a longer transmission duration for transmitting an SR based on determining that no response has been received; and
   transmit the SR to the network node using the longer transmission duration.

6. The UE of claim 5, wherein the determined transmission duration comprises one of multiple different transmission durations with which the UE is configured.

7. The UE of claim 5, wherein the instructions are such that the UE is operative to transmit the SR to the network node the particular number of times by transmitting each SR with a same transmission power or a greater transmission power than that of its preceding SR transmission.

8. The UE of claim 5, wherein transmission of one or more SRs depends on a logical channel over which the one or more SRs are transmitted.

* * * * *